United States Patent
Rao

(10) Patent No.: US 9,203,272 B1
(45) Date of Patent: Dec. 1, 2015

(54) STEALTH END WINDINGS TO REDUCE CORE-END HEATING IN LARGE ELECTRIC MACHINES

(71) Applicant: Dantam K. Rao, Schenectady, NY (US)

(72) Inventor: Dantam K. Rao, Schenectady, NY (US)

( * ) Notice: Subject to any disclaimer, the term of this patent is extended or adjusted under 35 U.S.C. 154(b) by 0 days.

(21) Appl. No.: 14/752,906

(22) Filed: Jun. 27, 2015

(51) Int. Cl.
| | |
|---|---|
| *H02K 21/12* | (2006.01) |
| *H02K 1/22* | (2006.01) |
| *H02K 1/17* | (2006.01) |
| *H02K 3/12* | (2006.01) |
| *H02K 3/42* | (2006.01) |
| *H02K 1/16* | (2006.01) |

(52) U.S. Cl.
CPC ............... *H02K 1/223* (2013.01); *H02K 1/16* (2013.01); *H02K 1/17* (2013.01); *H02K 3/12* (2013.01); *H02K 3/42* (2013.01)

(58) Field of Classification Search
CPC ......... H02K 3/51; H02K 1/27; H02K 1/2706; H02K 1/272; H02K 1/021; H02K 9/00; H02K 1/223; H02K 1/17; H02K 3/12; H02K 3/42; H02K 1/16
See application file for complete search history.

(56) References Cited

U.S. PATENT DOCUMENTS

| | | | |
|---|---|---|---|
| 3,731,127 A | 5/1973 | Harrington | |
| 3,780,428 A | 12/1973 | Zorev et al. | |
| 3,886,387 A | 5/1975 | Graham et al. | |
| 3,894,253 A | 7/1975 | Willyoung | |
| 3,935,037 A | 1/1976 | Muzyka et al. | |
| 4,031,422 A | 6/1977 | Armor et al. | |
| 4,054,809 A | 10/1977 | Jefferies | |
| 4,121,953 A | 10/1978 | Hull | |
| 4,152,615 A | 5/1979 | Calfo et al. | |
| 4,177,398 A | 12/1979 | Zagorodnaya et al. | |
| 4,208,597 A | 6/1980 | Mulach et al. | |
| 4,258,281 A | 3/1981 | Calfo et al. | |
| 4,281,266 A | 7/1981 | Calfo et al. | |
| 4,633,554 A | 1/1987 | Clark et al. | |
| 4,638,199 A | 1/1987 | Brem et al. | |
| 6,417,586 B1 | 7/2002 | Jarczynski et al. | |
| 6,455,977 B2 | 9/2002 | Leyvraz et al. | |
| 6,525,444 B2 | 2/2003 | Salem et al. | |
| 6,608,419 B2 | 8/2003 | Shah et al. | |
| 6,617,749 B2 | 9/2003 | Salamah et al. | |
| 6,688,136 B1 | 2/2004 | Lemberg | |

(Continued)

OTHER PUBLICATIONS

S. C. Mecrow, A. G. Jack, C. S. Cross, Electromagnetic deisign of turbogenerator stator end regions, Proc. IEE, vol. 136, Pt C, No. 6, pp. 361-372, Nov. 1989.

(Continued)

*Primary Examiner* — Michael Zarroli

(57) ABSTRACT

The end windings in the stator and rotor are major sources of core-end heating in large electric machines. This invention discloses a Stealth End Winding that makes some of the end-turns within these end windings to be magnetically invisible or stealth in order to reduce the core-end heating. It employs permanent magnets in proximity of these end windings to flip the magnetic field of stealth end-turns, making them to point in a direction away from the core-end. This action reduces the magnetic field that hits the core-end, which in turn reduces core-end heating. A Stealth End Winding can potentially eliminate prevailing devices such as the flux shield, flux shunt, core-end stepping, slit-teeth etc that have been used so far to reduce the core-end heating. Elimination of core-end stepping reduces the field current thereby increase the efficiency and power rating. Elimination of flux shield reduces cost and cooling needs.

5 Claims, 5 Drawing Sheets

(56) References Cited

U.S. PATENT DOCUMENTS

| | | |
|---|---|---|
| 6,703,733 B1 | 3/2004 | Wang et al. |
| 6,858,967 B2 | 2/2005 | Montgomery et al. |
| 7,057,324 B2 | 6/2006 | Breznak et al. |
| 7,247,958 B2 | 7/2007 | Iwashige et al. |
| 7,265,473 B2 | 9/2007 | Salem et al. |
| 7,812,501 B2 | 10/2010 | Taniyama et al. |
| 7,843,104 B2 | 11/2010 | Thangirala |
| 8,022,591 B2 | 9/2011 | Chay et al. |
| 8,115,352 B2 | 2/2012 | Neje et al. |
| 8,222,780 B2 | 7/2012 | Jha et al. |
| 8,513,841 B2 | 8/2013 | Rotzinger et al. |
| 2003/0201689 A1 | 10/2003 | Shah et al. |
| 2005/0121992 A1 | 6/2005 | Leonov |
| 2009/0184594 A1 | 7/2009 | Chay et al. |
| 2011/0241455 A1* | 10/2011 | Yoshida et al. ............. 310/44 |

OTHER PUBLICATIONS

C. V. Maughan, Generators: problems experienced with modern generators, Combined Cycle Journal, 4Q/2013.

* cited by examiner

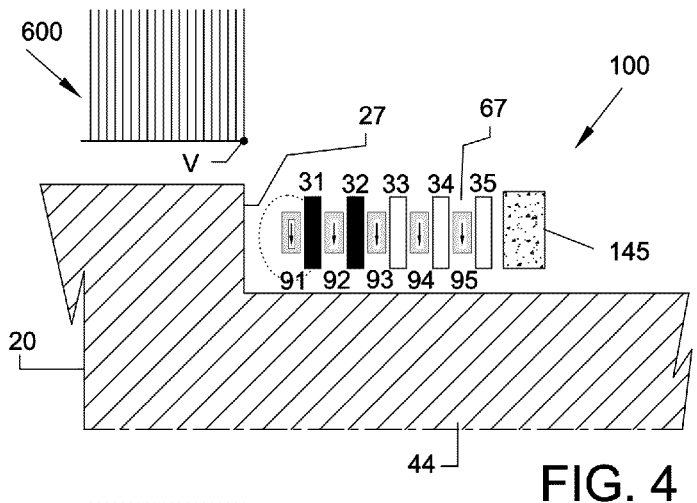
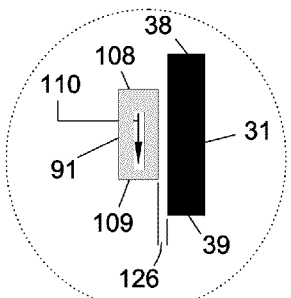
FIG. 4
FIG. 4A
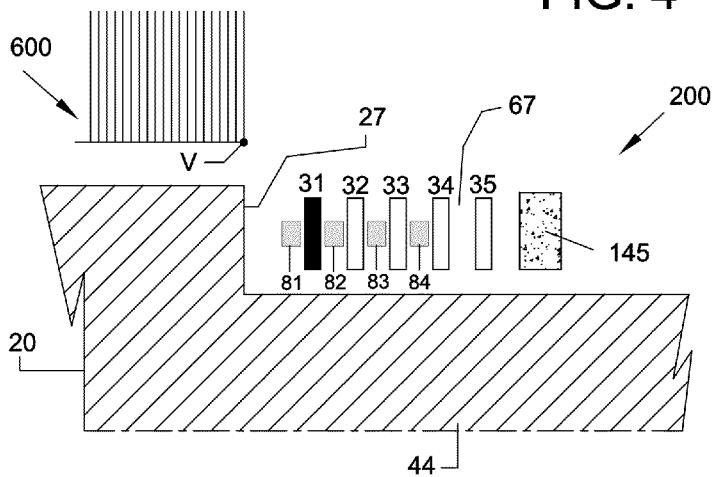
FIG. 5
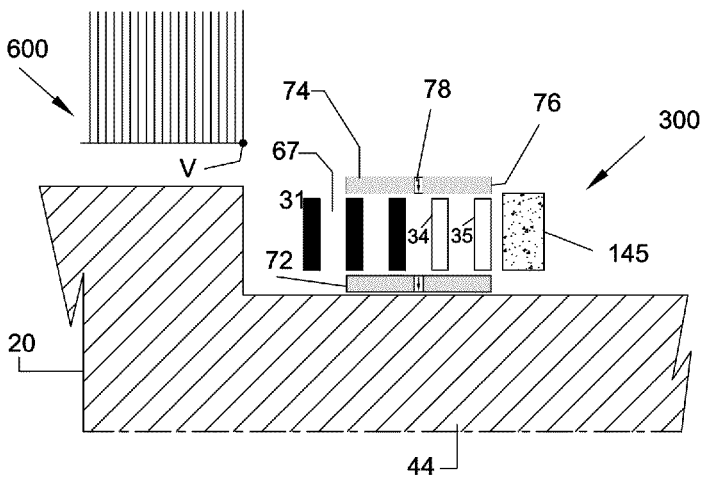
FIG. 6

STEALTH END WINDINGS TO REDUCE CORE-END HEATING IN LARGE ELECTRIC MACHINES

FIELD OF THE INVENTION

The present disclosure relates to the core-end heating in large electric machines, particularly to devices and methods that reduce the core-end heating.

BACKGROUND OF THE INVENTION

The core-end of a large electric machine contains a stator core-end and a rotor core-end. The stator core-end ("core-end") contains several parts, such as end-stepped laminations, press-finger, clamping ring, flux shield etc. plus a prevailing stator end winding. The rotor core-end also contains several parts, such as a magnetic spindle, a retaining ring, a centering ring etc. plus a prevailing rotor end winding. This prevailing rotor end winding comprises plurality of rotor end-turns, separated by plurality of interspaces, and is laid over the magnetic spindle, just outside the core. The prevailing stator end winding comprises several pairs of stator end-turns separated by interstices. All these rotor end-turns and stator end-turns are rectangular conductors that carry large DC and AC currents respectively. Their magnetic fields hit the core-end, causing core-end heating, so are the subject matter of the present disclosure.

The magnetic field produced by the prevailing rotor end winding has a large axial component that hits the large resistive surfaces in the core-end at 90°. The prevailing stator end winding can superpose an additional axial component as discussed in Paras [0047] to [0050]. Changes in the net axial magnetic field induce an eddy voltage in all resistive core-end parts according to Faraday's law. This eddy voltage induces large eddy current loops in them, which dissipate in the resistive bodies to produce core end heating. If this eddy voltage exceeds the inter-laminar insulation breakdown voltage, it can short defects in the end-stepped laminations, creating undetectable hot spots. This additional heat sharply increases the local temperature at the core-end, reducing the efficiency and power rating of the machine. The power rating is often limited to prevent core-end overheating, viz., exceeding specified thermal limits.

In prior art, several devices have therefore been developed to reduce core-end heating. These proven devices include, core-end stepping, flux shields, flux-shunts, shorter rotors, slitted teeth ("pistoye slots"), resistive or laminated clamping rings, low-loss or easy-axis steels, thicker insulation, complex vent ducts, etc. as reviewed in U.S. Pat. No. 8,203,249.

The core-end stepping trims the teeth at the core-end, in several steps in staircase fashion, to increase the magnetic gap locally. These teeth may also be slitted to reduce eddy currents further. Typical end-step profiles are shown in U.S. Pat. Nos. 2,795,714; 4,208,597; 6,455,977; 6,525,444; 6,688,136 and 7,265,473. The increased reluctance reduces the strength of the magnetic field locally, thereby reducing electric field, hence eddy-heat. Core-end stepping also causes the spot flux density at the tooth tip to fall below saturation, thereby discouraging formation of local hot spots. Even though very popular, the core-end stepping has several drawbacks.

For example, higher excitation, required by the increased reluctance, lowers the overall efficiency per U.S. Pat. No. 6,525,444. The core-end stepping reduces the clamping pressure on the teeth, causing flutter and machine failure per U.S. Pat. No. 7,057,324. Mecrow in 1989 suggested that core-end stepping might have limited success in reducing the axial flux under load, casting doubts on its efficacy. Too deep end-stepping can damage the machine per Maughan 2013. Optimal end-step profile often requires expensive three-dimensional magnetic field simulations. The shearing/slitting needed to make end-stepped laminations can degrade their magnetic quality. The sharp end-steps can also produce coolant-starved zones that could cause hot spots. A flux shield is still needed to prevent overheating of press-fingers, clamping rings etc.

In view of these numerous drawbacks, it is desirable to develop an alternative device that can reduce core-end heating without core-end stepping. This disclosure presents such alternative device, termed Stealth End Winding. It can potentially replace alternative devices such as the flux shield, pistoye slots, complex vent ducts, expensive steel etc. that are presently used to reduce core-end heating. Elimination of all these expensive parts makes the Stealth End Winding commercially attractive.

FIG. 1 shows a prevailing core-end in a large electric machine of prior art. It comprises a stator core-end 60 and a rotor core-end 64. The stator core-end 60 ("stepped core-end") comprises end-stepped laminations 62, a press-finger 66, a clamping ring 68 and vent ducts 58 etc. An optional flux shield 69 is shown by dashed lines. The prevailing stator end winding is not shown for clarity. The rotor core-end 64 is made of a magnetic rotor 20 with a stepped down portion termed magnetic spindle 44 (hatched area) that faces the stator core-end 60. The step-down 27 on the rotor is optionally aligned with the last core-end lamination CFT as shown. The magnetic spindle 44 supports the prevailing rotor end winding. The prevailing rotor end winding is synonymous to a plurality of rotor end-turns. Five rotor end-turns 31-35, shown as dark-shaded rectangles, separated by plurality of interspaces 67, illustrate the rotor end winding. They carry DC currents into the plane of the paper. They are cradled in a cavity formed by the step-down 27, the magnetic spindle 44, a centering ring 45 and a non-magnetic retaining ring (not shown).

FIG. 2 details a single rotor end-turn 50 ("end-turn"), which is an extension of a field turn 24 outside its slot 22. It comprises plurality of flat conductors which are not shown for clarity. Each end-turn 50 comprises a straight-turn 26 and an arc-turn 30. The straight-turn 26 portion of the end-turn 50 is straight, axial and protrudes out of the step-down 27. It produces magnetic field lines 42 in a plane parallel to the cross-section of the rotor. For clarity, this disclosure shows only portions of the magnetic field lines that flow through air. The magnetic field lines 42 obviously do not hit the core-end 60. Hence, the straight-turn 26 does not cause core-end heating.

The arc-turn 30 portion of the end-turn 50 is a circular arc over the magnetic spindle 44, subtending an angle at the center. The arc-turn 30 has a rectangular cross-section 31 with an outer radius 38 and an inner radius 39 (FIG. 4A). The DC field currents flowing through arc-turn 31 produce magnetic field lines 40 in a plane that is parallel to a longitudinal section of the rotor. It is clear that such magnetic field lines 40 do hit the core-end. So the terms rotor end-turn, its rectangular cross-section, and their labels are used loosely to refer to an arc-turn of a rotor end winding.

FIG. 3 shows the net magnetic field lines 40 produced by the prevailing rotor end winding alone, viz., from all arc-turns 31-35. Such net magnetic field lines 40 hit the end-stepped laminations 62, press-fingers 66, clamping ring 68, flux shield 69 etc and return back via stator core-end 60 and magnetic spindle 44 to close the loop around the arc-turns 31-35. When the rotor rotates, their changing axial component induce electric field per Faraday law. This electric field causes eddy currents in all the core-end parts, which in turn generates large eddy heat. This establishes that the arc-turns 31-35 are a major source of core-end heating.

SUMMARY OF THE INVENTION

A major object of the present invention is to reduce core-end heating of all core-end parts. Another object is to potentially replace the prevailing devices such as core-end stepping, flux shield, flux shunts, slit-teeth etc. used to reduce core-end heating with a simpler device. Another object is to clamp the tooth fully, up to its tip thereby avoiding tooth flutter failure. Another object is to reduce the overall cost of the machine. Another object is to increase the efficiency of the machine. Another object is to increase the power rating of the machine. These and other objects can be understood by a person skilled in the art on perusal of the detailed description of the invention.

The Stealth End Winding embodiments disclosed herein attempt to reduce the core end heating caused by the prevailing rotor end winding and the stator end winding. The embodiments employ external field sources, which are sized and placed in the prevailing end winding in such a fashion that the magnetic field produced by some of the prevailing end-turns is diverted away from the core-end and do not hit it (i.e., they become stealth). This reduces the number of end-turns whose magnetic field actually hits the core-end, thereby reducing the core-end heating significantly. A well-designed Stealth End Winding can reduce the core-end heating by as much as 90% or more.

The disclosed Stealth Rotor End Winding embodiments 100, 200, 300 employ permanent magnets ("magnets") in proximity of the prevailing rotor end winding to reduce core-end heating. These magnets are preferably inserted in the interspaces 67 between the prevailing rotor end-turns. They divert the magnetic field lines produced by some end-turns away from the core-end. Those end-turns, whose magnetic field does not hit the core-end, are called stealth-turns. The magnets introduced into the rotor end winding literally flip the magnetic field produced by these stealth-turns by 180°. Creation of the stealth-turns greatly weakens the magnetic field that hits the core-end, thereby drastically reducing the core-end heating.

The disclosed Stealth Stator End Winding embodiment 400 employs bar magnets in proximity of the prevailing stator end winding to reduce core-end heating. Preferably they are inserted in the interstice 404 that separates the pair of stator end-turns of the prevailing stator end winding. The magnetic field lines produced magnets overpower that by those from stator end-turns so that the net magnetic field hitting the core-end is weakened, thereby drastically reducing the core-end heating.

BRIEF DESCRIPTION OF THE DRAWINGS

FIG. 4 discloses a Three stealth-turns embodiment. This embodiment adds flat magnets in all interspaces of arc-turns.

FIG. 4A is an inset of FIG. 4 indicating the geometrical relation between a flat magnet and an arc-turn.

FIG. 5 discloses a Four stealth-turns embodiment. This embodiment adds flat magnets in some interspaces of arc-turns.

FIG. 6 discloses a Two stealth-turns embodiment. This embodiment sandwiches arc-turns between two segment magnets.

DESCRIPTION OF THE EXEMPLARY EMBODIMENTS

Figure 1:
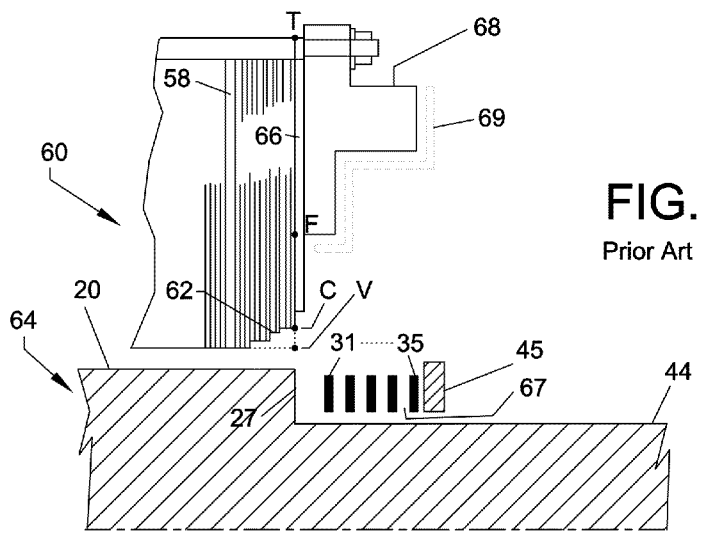
FIG. 1 displays the core-end of a large electric machine in prior art, identifying the core-end stepping and the prevailing rotor end-turns.
Figure 2:
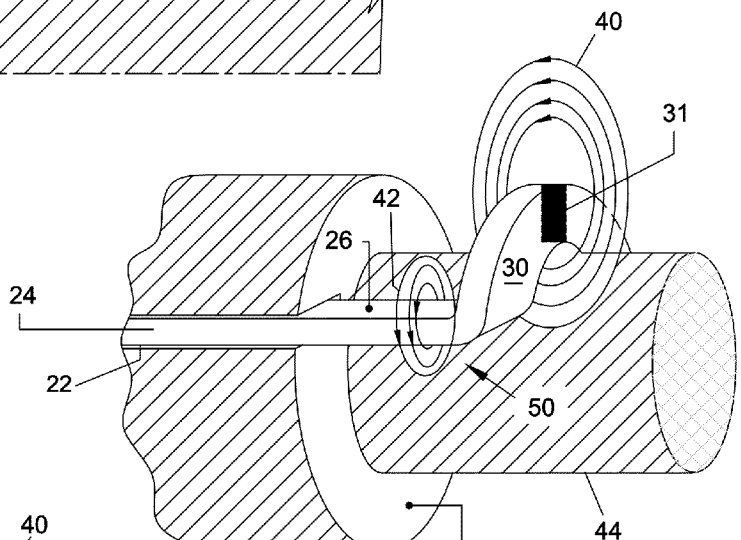
FIG. 2 shows a single rotor end-turn, highlighting the magnetic field lines produced by its arc-turn portion.

This disclosure presents several Stealth End Winding embodiments 100, 200, 300, and 400 to reduce the core end heating. Of these, the Stealth Rotor End Winding embodiments 100, 200, 300 are discussed in Paras [0032] to [0046] and FIGS. 4-10. For clarity, these figures do not show the stator end winding that is inactive. The Stealth Stator End Winding embodiment 400 is discussed in Paras [0047] to [0050] and FIGS. 11-13. For clarity, these figures do not show the rotor end winding that is inactive. In reality, when both types of end windings are present, the principle of superposition can be used to map the net magnetic field, as known in the art.

A "shield-free core-end" 600 is preferably used with all the disclosed Stealth End Winding embodiments. This 600 is identical to the prevailing core-end 60, except that it does not have (a) core-end stepping 62, (b) flux shield 69, (c) slit-teeth, and has a non-magnetic centering ring 145. Discarding the core-end stepping eliminates the steps of shearing, deburring, slitting etc, so simplifies manufacturing. It allows one to clamp the entire tooth, thereby preventing tooth chatter and machine failure. It also reduces the field current, thereby increases the efficiency. Elimination of the flux shield and slit-teeth also significantly reduces the cost. All the disclosed embodiments can optionally be used with the prevailing core-end 60 as well.

The Stealth Rotor End Winding embodiments 100, 200, 300 comprise the prevailing rotor end winding (synonymous to the rotor end-turns 31-35), plus plurality of magnets in its proximity. These magnets are represented by gray-shaded rectangles (e.g. 91, 81, 74). Magnetic fields from these magnets convert some of the rotor end-turns 31-35 into "stealth-turns". The terms "stealth-turn", "magnetically invisible end-turn" synonymously refer to an end-turn whose magnetic field does not hit the core-end. A stealth-turn is magnetically invisible for a person sitting on the stator core-end, so they do not cause core-end heating. A stealth-turn is indicated by an unshaded rectangle (e.g., 33, 34, 35 in FIG. 4). The terms "nonstealth-turn", "magnetically visible end-turn" synonymously refer to an end-turn whose magnetic field hits the core-end, causing core-end heating. A nonstealth-turn is indicated by a dark-shaded rectangle (e.g., 31, 32 in FIG. 4).

FIG. 4 shows a first Stealth Rotor End Winding embodiment 100. Termed a "Three stealth-turns" embodiment, it employs plurality of flat magnets 91-95 in proximity of the prevailing rotor end winding. A prototypical flat magnet 91 is shaped as a slice of an annular disc. It has a rectangular cross-section as shown in FIG. 4A. Its magnetization axis 110 runs from its outer radius 108 to its inner radius 109. Its outer radius 108 is smaller than the outer radius 38 of the arc-turn 31. Its inner radius 109 is larger than that the inner radius 39 of the arc-turn 31. It is bound by two flat faces that are normal to its geometric axis and by two radial faces that subtend an arc-angle at the center of the disc. This arc angle preferably equals the arc angle subtended by an arc-turn. Optionally this arc angle is an integral fraction of the arc angle of an arc-turn. All flat magnets 91-95 are preferably identical in size and location. Optionally each flat magnet can differ in size and location.

The flat magnets 91-95 are generally located in proximity of the prevailing rotor end winding. Preferably, they are located in all interspaces 67 of the prevailing rotor arc-turns 31-35. They are oriented such that their cross-section lies in the longitudinal section of the magnetic spindle 44. That is, their flat faces are parallel to those of arc-turns. Their mean radius is preferably identical to that of arc-turns 31-35. The flat surfaces of the flat magnets 91-95 are separated from those of the arc-turns by an air gap 126 that is filled with an insulative medium. A single flat magnet may span the entire angular periphery of an arc-turn. Optionally plurality of smaller flat magnets may be equispaced at different angular positions around the periphery of an arc-turn.

The flat magnets 91-95 are optionally embedded within the prevailing space blocks (not shown) that separate the arc-turns 31-35. Such magnet-cored space blocks, spaced at different angular positions, can form coolant passageways for the arc-turns 31-35. Optionally the flat magnets may have enhanced surfaces whose larger heat transfer area facilitates cooling of the Stealth End Winding. Para [0039] below describes how this embodiment 100 creates three stealth-turns 33, 34, 35 (shown as three unshaded rectangles in FIGS. 4 and 7).

FIG. 5 shows a second Stealth Rotor End Winding embodiment 200. Termed a "Four stealth-turns" embodiment, it also employs flat magnets 81-84, but in fewer interspaces 67 of the prevailing rotor arc-turns 31-35. These interspaces are preferably closer to the core-end 500. A prototypical flat magnet 81 is shaped as a slice of an annular disc with a rectangular cross-section. It has a smaller aspect ratio as shown in FIG. 5A. Each of the flat magnets 81-84 is similar to flat magnets 91-94 in geometry, location, and magnetization. They are optionally embedded inside conventional space blocks (not shown) that separate and form the coolant passageways for the arc-turns. Para [0040] below describes how this embodiment 200 creates four stealth-turns 32, 33, 34, 35 (shown as four unshaded rectangles in FIGS. 5 and 8).

FIG. 6 shows a third Stealth End Winding embodiment 300. Termed a "Two stealth-turns" embodiment, it employs a pair of segment magnets 72, 74 that sandwich the prevailing rotor end winding. In a preferred version, the pair of segment magnets sandwich all but a first end-turn 31. An insulative medium fills the air gaps that separate the segment magnets from the end turns 32-35. Each of the pair of segment magnets 72, 74 have the shape of an angular subdivision of a hollow cylinder. The magnetization axis 78 of a segment magnet runs from an outer periphery to an inner periphery of the hollow cylinder. The curved periphery of a segment magnet 74 conforms to that of the arc-turns 31-35. Its cross-section is rectangular as shown. It has an outer periphery and a wall thickness 76. The radius of the outer periphery is longer than the outer radius 38 of an arc-turn 31. The wall thickness 76 is shorter than the long side of an arc-turn 31. Para [0041] below describes how this embodiment 300 creates two stealth-turns 34, 35 (shown as two unshaded rectangles in FIGS. 6 and 9).

In all these Stealth Rotor End Winding embodiments 100, 200, 300, the number of magnets, their orientation, size, material, grade and the air gap from the prevailing end-turns control the strength and direction of their magnetic fields relative to that produced by the prevailing rotor end-turns 31-35. They control the ability to flip the magnetic fields of some end-turns, away from the core-end, thereby produce stealth-turns. The magnets are made of commercially available Samarium Cobalt (SmCo) or Neodymium Boron Iron (NdBFe) materials. The grade and material of the magnets is chosen so that they can withstand the high temperatures and rotational stresses. Following FIGS. 7-9 show the net magnetic fields in all these stealth embodiments with a shield-free core-end when the rotor is spinning at 60 Hz.

Figure 7:
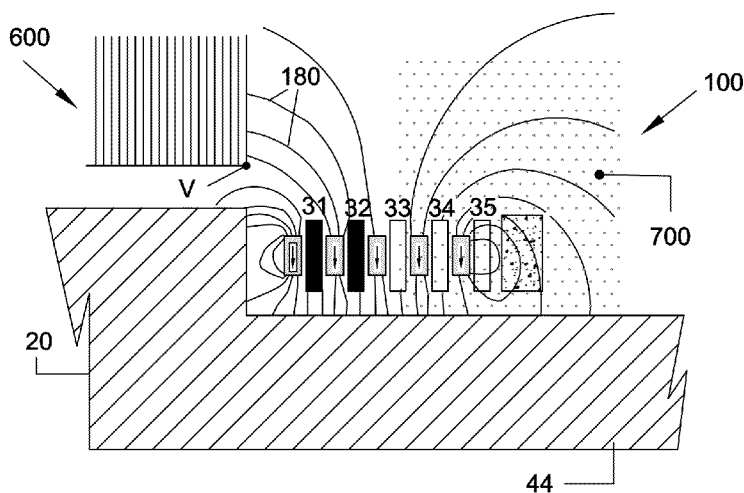
FIG. 7 shows magnetic field lines produced by the Three stealth-turns embodiment. It shows that the magnetic field from three stealth-turns does not hit the core-end.

FIG. 7 shows the magnetic fields produced by the Three stealth-turns embodiment 100. It clearly illustrates that this embodiment splits the magnetic field into two distinct zones. In a stealth zone 700, the magnetic field lines produced by three end-turns 33, 34, 35 point 'outwards", away from the core-end 600. On comparing with FIG. 3, it can be seen that the flat magnets 91-95, introduced into the prevailing rotor end winding—literally flipped the magnetic field of these three end-turns 33, 34, 35 lines, rotating them by 180°. As a result, their magnetic field does not hit the core-end 600. Thus, the flat magnets 91-95 effectively created three stealth-turns 33, 34, 35 (shown as three unshaded rectangles). These stealth turns 33, 34, 35 do not cause core-end heating. The magnetic field lines 180 produced by the remaining two non-stealth-turns 31, 32 (shown as shaded rectangles) do hit the core-end 600. But this magnetic field 180 is weaker than that produced when all the five nonstealth-turns act together. Hence this weaker magnetic field 180 reduces the core-end heating.

Figure 8:
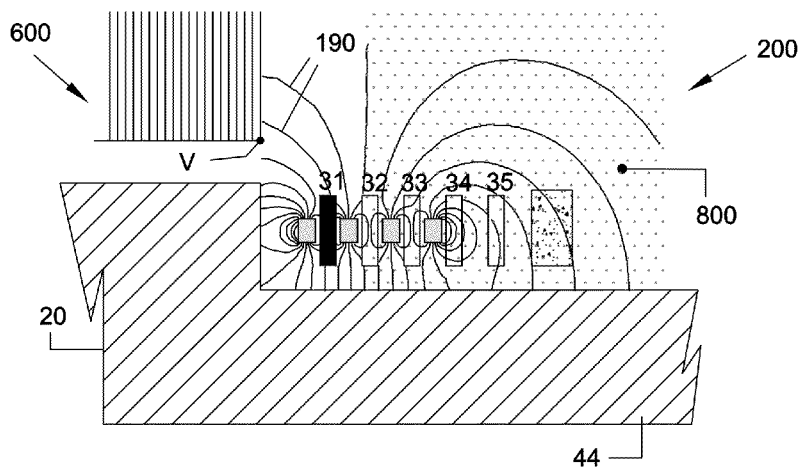
FIG. 8 shows magnetic field lines produced by the Four stealth-turns embodiment. It shows that the magnetic field from four stealth-turns does not hit the core-end.

FIG. 8 shows the magnetic field produced by the Four stealth-turns embodiment 200. It also clearly illustrates that this embodiment splits the magnetic field into two distinct zones. In a stealth zone 800, the magnetic field lines produced by four end-turns 33, 33, 34, 35 point outwards, away from the core-end 600. On comparing with FIG. 3, it can be seen that the flat magnets 81-84, introduced into the prevailing rotor end winding—literally flipped the magnetic field lines of these four end-turns 33, 33, 34, 35, rotating them by 180°. As a result, their magnetic field does not hit the core-end 600. Thus the flat magnets 81-84 effectively created four stealth-turns 32, 33, 34, 35 (shown as four unshaded rectangles). These stealth turns 32, 33, 34, 35 do not cause core-end heating. The magnetic field lines 190 produced by the remaining nonstealth-turn 31 (shown as a shaded rectangle) do hit the core-end 600. But its magnetic field 190 is weaker than that produced when all the five nonstealth-turns act together. Hence this weaker magnetic field 190 reduces the core-end heating.

Figure 9:
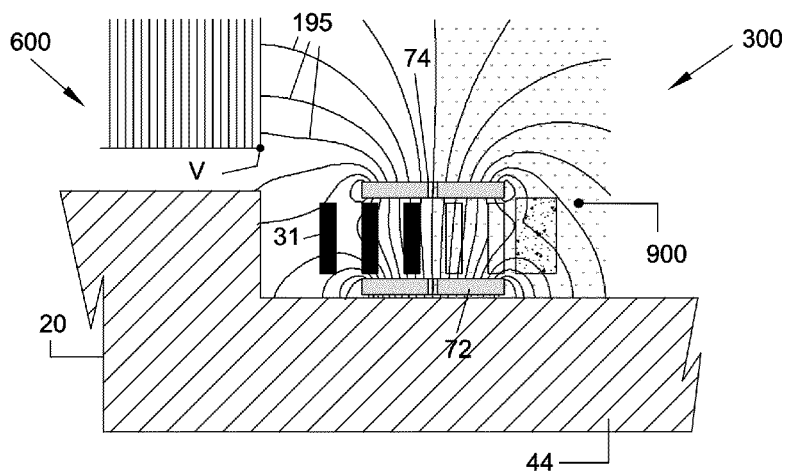
FIG. 9 shows magnetic field lines produced by the Two stealth-turns embodiment. It shows that the magnetic field from two stealth-turns does not hit the core-end.

FIG. 9 shows the magnetic field produced by the Two stealth-turns embodiment 300. This embodiment also splits the magnetic field into two distinct zones. In a stealth zone 900, the magnetic field lines produced by two end-turns 34, 35 point outwards, away from the core-end 600. On comparing with FIG. 3, it can be seen that the segment magnets 72, 74, introduced into the prevailing rotor end winding—literally flipped the magnetic field of two end-turns 34, 35, rotating them by 180°. As a result, their magnetic field does not hit the core-end 600. Thus, the segment magnets 72, 74 effectively created two stealth-turns 34, 35 (shown as two unshaded rectangles). These stealth-turns 34, 35 do not cause core-end heating. The magnetic field lines 195 produced by the remaining nonstealth-turns 31, 32, 33 (shown as shaded rectangles) do hit the core-end 600. But this magnetic field 195 is weaker than that produced when all the five nonstealth-turns act together. Hence this weaker magnetic field 195 reduces core-end heating.

An electric field E (V/m) is produced when these changing magnetic fields 180, 190, 195 per Faraday Law. E can be estimated by a finite element magnetic field software. The core-end heat q in a volume V of a material with conductivity σ can then be calculated from $q=(\frac{1}{2})\int_V \sigma E^2 dV$. The core-end heat reduction capability of an embodiment can thus be bench-marked by comparing their electric field E with that produced by prior art. A representative core-end line VCFT (see FIG. 1) is chosen to make such comparison. Here F and T denote the flange bottom point and outer perimeter points. Both points are common to the shield-free core-end 600 and the prevailing core-end 60. V denotes the corner point in the shield-free core-end 600 that has no end-stepped laminations. C denotes the corner of outermost end-step in the prevailing core-end 60. Both V and C see maximum electric fields, viz., they are the hottest areas in the shield-free core-end 600 and the prevailing core-end 60.

Figure 10:
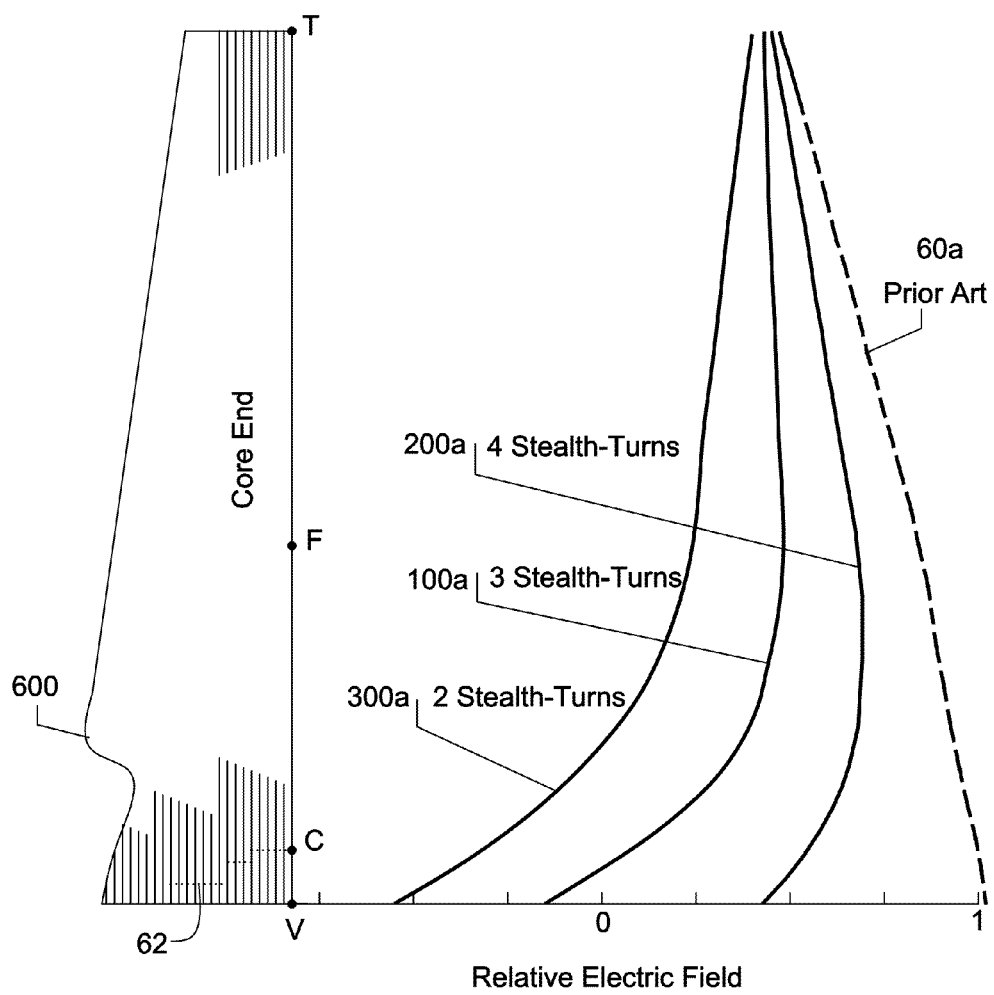
FIG. 10 compares the electric field from the disclosed embodiments with that from prior art. It shows that the Three stealth-turns embodiment can reduce the maximum electric field by more than 80%

FIG. 10 compares the electric field along the core-end line VCFT in the Stealth End Winding embodiments 100, 200, 300 vs. the prevailing core-end 60. The left side shows the line VCFT in the shield-free core-end 600, the prevailing core-end 60 and the core-end stepping 62. The horizontal line shows the relative electric field E normalized to 1 V/m at the hottest corner C in the prevailing core-end 60. The curves 100a, 200a, 300a, 60a show the variation of electric field E along VCFT in the embodiments 100, 200, 300, 60 respectively. They clearly show that embodiments 100, 200, 300 greatly reduce electric field (hence core end heating) compared to that in the prevailing core-end 60.

An Electric Field Reduction Factor $R=100(E_C-E_V)/E_C$ expresses the percentage by which an embodiment reduces the maximum electric field relative to that produced by the prevailing core-end 60. Here $E_C$ denotes the magnitude of maximum electric field at the hottest corner C in the prevailing core-end 60. $E_V$ denotes the magnitude of maximum electric field at the hottest corner V in the Stealth End Winding embodiments 100, 200, 300. Following Table 1 summarizes this Electric Field Reduction Factor R for various embodiments.

TABLE 1

Electric Field Reduction Factor R for various embodiments.

Figure 3:
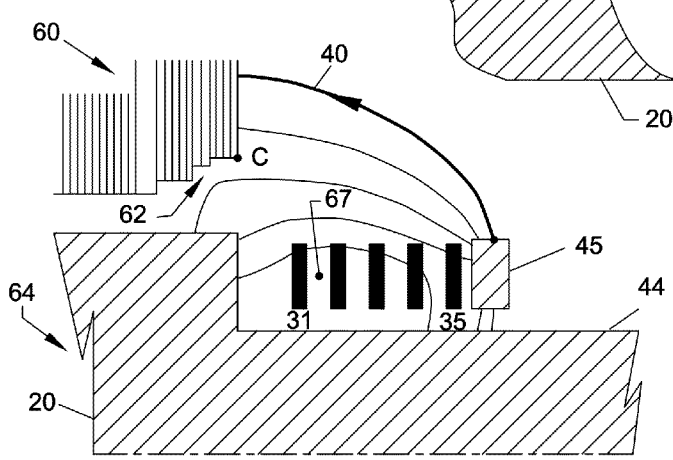
FIG. 3 shows the net magnetic field lines, produced by the prevailing rotor end winding, hitting the core-end.

| Nr | Embodiment | Figure | Electric Field Reduction Factor R |
|---|---|---|---|
| 0a | Prevailing core-end 60 without flux shield | FIG. 3 | 0% |
| 0b | Prevailing core-end 60 with flux shield | FIG. 3 | 67% |
| 1 | Three stealth-turns 100 | FIG. 4 | 83% |
| 2 | Four stealth-turns 200 | FIG. 5 | 57% |
| 3 | Two stealth-turns 300 | FIG. 6 | 47% |

This Table 1 shows that the Three stealth-turns embodiment 100 (FIG. 4) reduces the maximum electric field by more than 80%. This reduction is even superior to that (67%) achieved by a prevailing core-end 60 that employs an expensive flux shield to reduce core-end heating. Since the core end heating is proportional to square of electric field E, it is obvious that the Three stealth-turns embodiment 100 can drastically reduce the core-end heating.

The core-end is also heated by an axial component of the prevailing stator end winding—in addition to that of the prevailing rotor end winding as discussed in Paras [0032] to [0046]. When a machine is underexcited (i.e., operated with a leading power factor) an electric field $E_{AC}$ due to AC currents in the stator end winding alone, vectorially adds to an electric field $E_{DC}$ due to DC currents alone in the rotor end winding. The higher net electric field $E_{net}=E_{AC}+E_{DC}$ increases the core-end heating further. The next few paras present a stealth stator end winding embodiment 400 that can potentially combat such increase in core-end heating.

Figure 11:
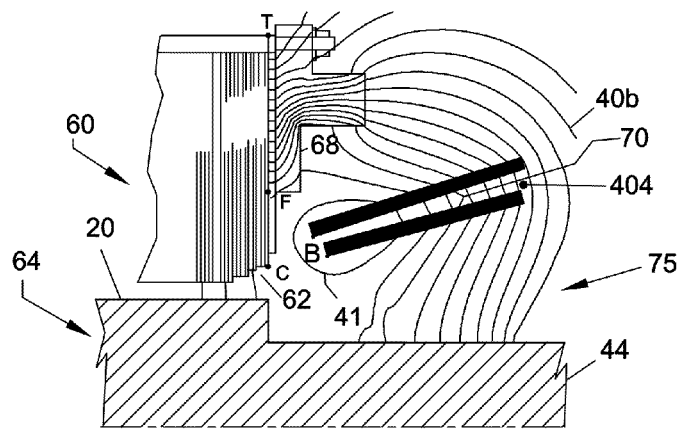
FIG. 11 shows the magnetic field lines produced by the prevailing stator end winding hitting the core-end.

FIG. 11 illustrates the magnetic field lines 40b produced by the prevailing stator end winding 70 when acting alone. The rotor end winding is inactive and is not shown herein for clarity. This prevailing stator end winding 70 comprises a pair of stator end-turns separated by an interstice 404 and distributed around the periphery as known in the art. It is nonstealth, hence is shown as a dark shaded rectangle. The shown magnetic field lines 40b are due to an imaginary axial component of AC current that runs into the plane of paper, caused by the prevailing stator end winding 70. These magnetic field lines 40b hit the clamping ring 68, core-end CFT, core-end stepping 62 and return through the magnetic spindle 44 before closing the loop around the prevailing stator end winding 70. The portion CF under the clamping ring attracts the inner most point B of the prevailing stator end winding 70. A strongest magnetic loop 41 forms close to B. This strongest magnetic field causes largest concentrated heat around the prevailing core-end corner C.

Figure 12:
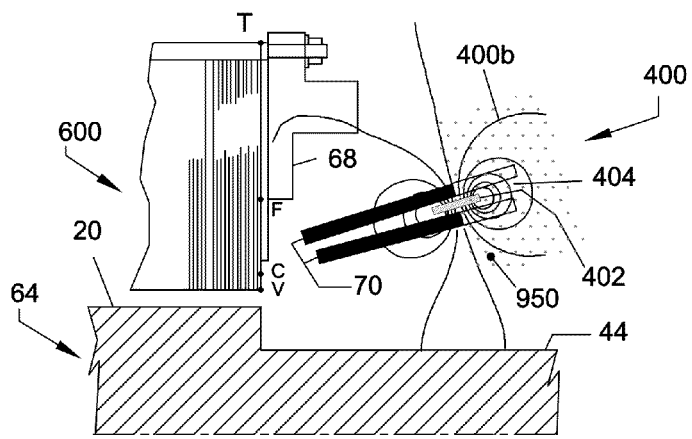
FIG. 12 discloses a Stealth Stator End Winding embodiment. This embodiment adds a bar magnet in the interstice between end-turns of a prevailing stator end winding.

FIG. 12 illustrates a Stealth Stator End Winding embodiment 400 to reduce such core-end heating. This comprises the prevailing stator end winding 70 plus a bar magnet 402 that is inserted in the interstice 404 of the two-stator end turns. The bar magnet 402 is magnetized along its thickness direction. It is generally located in proximity of the prevailing stator end winding 70. It is located preferably in the interstice 404 between the pair of stator end-turns 70. The longer dimension of the bar magnet 402 is parallel to the end turns. It is magnetized along the thickness dimension. The bar magnet 402 is located beyond the center of the prevailing stator end winding, away from the core-end. The magnetic field shown is the sum of the magnetic field produced by the bar magnet 402 plus that produced by the prevailing stator end winding 70. This figure shows in a stealth zone 950, the magnetic field lines 400b produced by the Stealth Stator End Winding embodiment 400 point in a direction away from the core-end 600. Thus, for a person sitting on the core-end, a portion of the Stealth Stator End Winding 400 is invisible or stealth (shown unshaded). The magnetic field produced by the nonstealth portion of stator end winding (shown shaded) is weaker. This weaker magnetic fields hits the core-end 600 and produces weaker eddy currents, thereby reduces the core-end heating.

Figure 13:
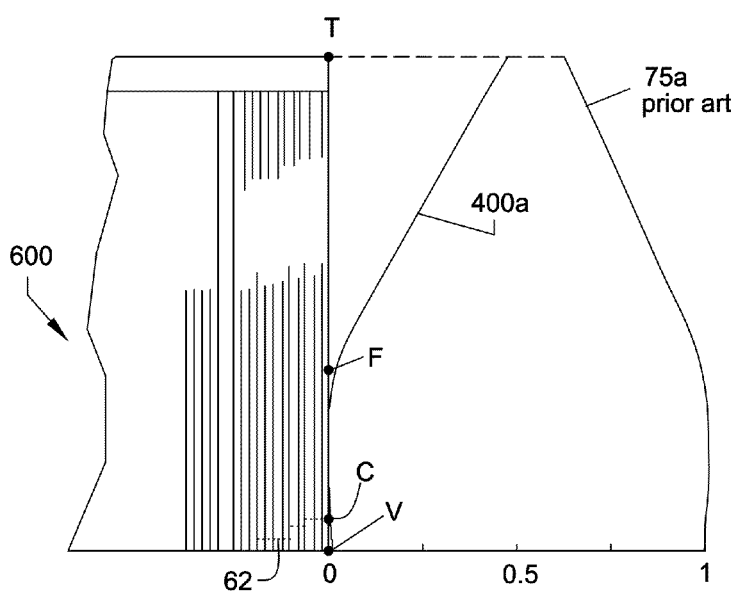
FIG. 13 compares the electric field from the disclosed Stealth Stator End Winding embodiment with that from the prevailing stator end winding.

FIG. 13 compares the electric field along the core-end line VCFT in the Stealth Stator End Winding embodiment 400 (FIG. 12) vs. prevailing core-end 75 (FIG. 11). Here the left side shows the line VCFT in the shield-free core-end 600, the prevailing core-end 60, plus the prevailing core-end stepping 62. The horizontal axis shows the relative electric field E, normalized to 1 V/m at the hottest corner C in the prevailing core-end 75. The curves 400a, 75a show the variation of electric field E in the Stealth Stator End Winding embodiment 400 and the prevailing core-end 75 respectively. These curves indicate that the Stealth Stator End Winding embodiment 400 significantly reduces the electric field. Specifically it suppresses the electric field from V to F (i.e., below the clamping ring) by three orders of magnitude, from a finite value to a near zero value. This indicates that this Stealth Stator End Winding embodiment 400 greatly reduces core end heating.

FIGS. 4-6, 12 illustrate only some of possible Stealth End Winding embodiments. A person skilled in the art can easily develop alternative embodiments of Stealth End Windings without altering the core principles presented herein. For example, one can alter the geometry, location or number of magnets etc. Such alternative embodiments are still subject to the claims of the present invention.

I claim:

1. A rotor end winding in a large electric machine to reduce core-end heating, comprising:
    a) a prevailing rotor end winding, comprising plurality of rotor end-turns having an outer radius and separated by a plurality of interspaces,
    b) flat magnets, shaped as a slice of an annular disc, and having a magnetization axis that runs from an outer radius to an inner radius of the flat magnets, wherein:
said flat magnets are located in proximity of said prevailing rotor end winding.

2. A rotor end winding in claim 1, wherein said flat magnets are located in the interspaces of said rotor end-turns.

3. A rotor end winding in claim 1, wherein the outer radius of said flat magnets is smaller than the outer radius of said rotor end-turns.

4. A rotor end winding in a large electric machine to reduce core-end heating, comprising:
    a) a prevailing rotor end winding, comprising plurality of rotor end-turns separated by plurality of interspaces,
    b) a pair of segment magnets, shaped as an angular subdivision of a hollow cylinder, and magnetized from an outer periphery to an inner periphery of the segment magnets, wherein:
said pair of segment magnets sandwich the prevailing rotor end winding.

5. A stator end winding in a large electric machine to reduce core-end heating, comprising:
    a) a prevailing stator end winding, comprising a pair of stator end-turns separated by an interstice,
    b) bar magnets magnetized along a thickness direction, wherein:
said bar magnets are located in proximity of said prevailing stator end winding;
    wherein, said bar magnets are located in the said interstice between the pair of stator end-turns.

* * * * *